United States Patent Office 3,474,624
Patented Oct. 28, 1969

3,474,624
HYDRAULIC CONTROL SYSTEM
Viggo H. Sparso and Leif Larsen, Virum, Denmark, assignors to Hans Christian Andersen, Kastanienbaum, Switzerland
Filed Jan. 26, 1968, Ser. No. 700,761
Claims priority, application Denmark, Jan. 30, 1967, 521/67
Int. Cl. F15b 21/02, 13/16
U.S. Cl. 60—52
9 Claims

ABSTRACT OF THE DISCLOSURE

To control a second member from a first member, oil is circulated through a two branch oil circuit including flow resistance elements governed by the first and second member respectively, and adjustment of the second member takes place in response to pressure differences between a point of one branch and a point of the other until pressure balance is re-established between the two points. One form of a flow resistance element is a slide surrounded by a guiding sleeve and provided with a helical groove in its circumferential surface. Another form of a flow resistance element is a rotor having an oil passage in which a back pressure is produced by centrifugal force. The form of control may be a manual control and a superposed automatic control. Several control systems may be combined for operation by a common master control unit.

BACKGROUND OF THE INVENTION

This invention relates to a hydraulic control system for controlling a second member in dependence on a first member. The first member may e.g. be a manual control knob or lever, or it may be a sensing member for sensing or detecting a physical value such as an electrical current or voltage or, say the tension of a textile web being conveyed through a textile processing machine, or the thickness of a layer of bulk goods being conveyed on a belt conveyor. The second member may e.g. be a valve, a variable resistor or capacitor, a variable speed gear, or a working machine of any kind.

It is an object of the invention to provide a simple reliable and accurate hydraulic control system, which is to a very high degree independent of variations of the viscosity of the hydraulic fluid with which it operates. As is well-known, the viscosity of most hydraulic fluids varies very substantially with the temperature and therefore many known hydraulic control systems, particularly systems having more than one hydraulic fluid circuit, or systems having both a static and a dynamic circuit, suffer from the drawback that if the system is adjusted for a certain control when a machinery controlled by the system is started up in cold condition, drifting is likely to occur gradually as the hydraulic fluid warms up.

SUMMARY OF THE INVENTION

According to the invention, a hydraulic control system for controlling a second member in dependence on a first member comprises a hydraulic fluid circuit having two branches connected to a common source of driving pressure for producing a continuous flow in each of said branches, flow resistance means being provided in both of said branches, some of said flow resistance means being variable in dependence on said first member and others being variable in dependence on said second member, pressure difference responsive means being provided to detect pressure differences between a point of one branch and a point of the other branch of said hydraulic fluid circuit, and means controlled by said pressure difference responsive means for adjusting said second member so as to vary the flow resistance means governed thereby in a sense to establish pressure balance between said two points of the oil circuit.

In a hydraulic control system arranged as described, the control function is based on the establishment of a state of equilibrium or proportionality between pressure drops in flow resistance means which are all passed by the same hydraulic liquid so that on variation of the temperature of the hydraulic fluid and consequently of its viscosity the said pressure drops will all vary substantially in the same proportion, so that drifting due to warming up of the hydraulic liquid is eliminated or reduced to a minimum.

One suitable form of a variable flow resistance means for use in a hydraulic control system according to the invention is a slide, referred to herein as a capillary slide, surrounded by a guiding sleeve, said capillary slide being provided in its circumferential surface with a helical groove which is closed by the wall of said guiding sleeve to form a helical capillary passage, a hydraulic fluid circulation passage extending through the wall of said guiding sleeve, and at least one other hydraulic fluid circulation passage communicating with one end of said guiding sleeve.

In this manner it becomes possible in a limited space to accommodate a high flow resistance which is very accurately variable even in the case of relatively small displacements of the capillary slide, because the variations of the flow resistance will be proportional to the variations of the length of the helical passage through which the hydraulic fluid has to flow, and thereby also proportional to the linear displacement of the capillary slide.

The capillary slide arrangement described may be further developed into a unit, which at the same time forms the branching point of the oil circuit and the pressure difference responsive means referred to above. For this purpose the guiding sleeve is itself slidably mounted in a housing having ports alternatively connectable to a hydraulic fluid inlet and to a hydraulic fluid outlet by displacement of said guiding sleeve in said housing, hydraulically operated adjusting means for said second member being connected between said ports, hydraulic fluid circulating passages being provided to communicate with both ends of said guiding sleeves. With this construction, assuming e.g. that the circulation passage through the wall of the guiding sleeve is a fluid inlet, hydraulic fluid enters the helical passage at an intermediate point thereof, determined by the position of the capillary slide in the guiding sleeve, and is branched off towards both ends of the latter so that the guiding sleeve, besides guiding the capillary slide, also forms a pressure difference responsive means, because its two ends are subjected to pressures corresponding to the pressure at which the hydraulic fluid enters the capillary passage less the pressure drops in the portions of the capillary passage on one and the other side of the hydraulic fluid inlet respectively.

In cases where the second member is a rotating part, the speed of rotation of which is to be controlled, it may sometimes be of advantage, instead of the form of flow resistance means described above, to use a flow resistance means in the form of a rotor coupled to said rotating part and having at least one hydraulic fluid passage provided therein, the inlet end of said hydraulic fluid passage being located at a greater distance from the axis of rotation of said rotor than the outlet end of said hydraulic fluid passage.

Further features of the invention will be apparent from the following detailed description of various embodiments.

DESCRIPTION OF THE PREFERRED EMBODIMENT

Figure 1:
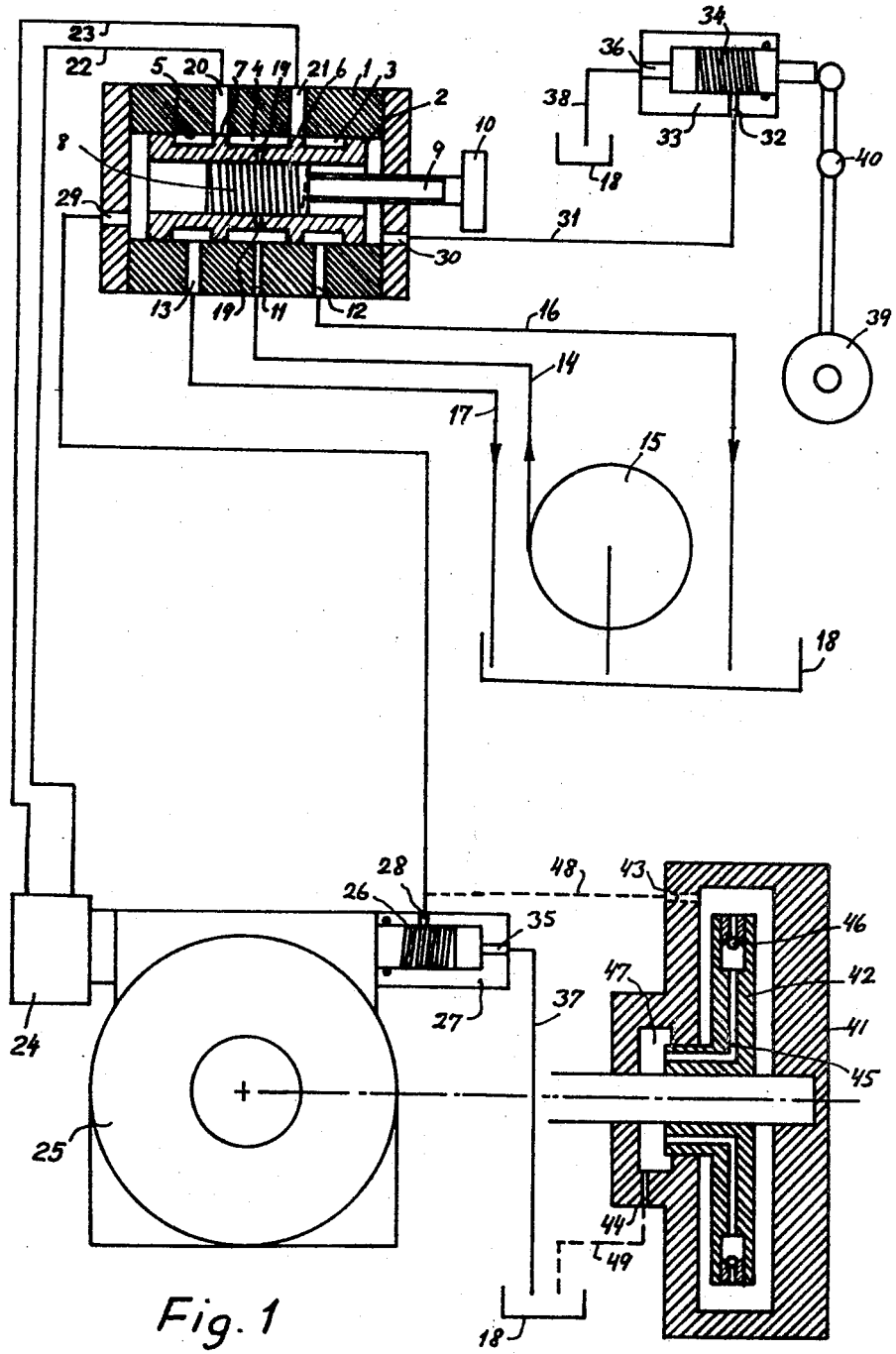
FIGURE 1 is a diagram illustrating a hydraulic control system according to one embodiment of the invention, and also illustrating two basic forms of flow resistance means that may be alternatively used in the embodiment illustrated.

In FIGURE 1, 1 is a cylindrical housing in which a sleeve 2 is slidably mounted. The sleeve 2 has three annular recesses 3, 4 and 5 separated by two cams 6 and 7. The sleeve 2 forms a guide for a slide 8 of the type referred to above as a capillary slide, i.e. a slide provided in its circumferential surface with a helical groove which may e.g. be in the form of a screw thread, and the open side of which is closed by the wall of the guiding sleeve 2 to form a helical passage. The term "capillary" is used herein to describe a passage, the cross sectional dimensions of which are very small as compared to its length, and it is immaterial for the purposes of the present invention whether the cross sectional dimensions of the passage are of the order of size generally referred to as capillary. This will of course depend on the size of the device and the rate of flow for which it is designed. Attached to the capillary slide is a threaded pin 9, which engages a threaded hole of the end wall of the housing 1 and carries a knob 10, which in the embodiment shown forms the principal control member of the system, or what has been referred to above as the "first member."

In the housing 1 there is provided an oil inlet passage 11, which opens into the recess 4, and two oil outlet passages 12 and 13, which open into the recesses 3 and 5 respectively. The passage 11 is connected through a conduit 14 to the pressure side of an oil pump 15, while the passages 12 and 13 are connected through conduits 16 and 17 respectively to an oil sump 18, to which the intake of the pump 15 is connected. For simplicity the oil sump 18 is shown at a plurality of locations in the drawing so as to avoid a confusing showing of long and mutually crossing conduits, but in fact all the symbols 18 are of course intended to refer to one and the same oil sump.

In the guiding sleeve 2 there are provided one or more passages 19 extending from the recess 4 to the inner wall of the guiding sleeve 2 along which the capillary slide 8 is displaceable.

In the housing 1 there are provided two ports 20 and 21 communicating through conduits 22 and 23 with a reversible oil motor 24 serving to adjust the ratio of a variable speed gear 25, e.g. of the type known in the trade as a "Kopp-variator," having a ball holding member the the inclination of which may be varied by means of a threaded slide engaged by a threaded shaft, which may then be connected to the reversible oil motor 24. In the embodiment illustrated in full lines, a capillary slide 26 is connected to one end of the threaded slide of the Kopp-variator and is slidable in a housing 27 having an inlet 28 communicating with an outlet 29 from the space to the left of the guiding sleeve 2 in the housing 1. In the space to the right of the guiding sleeve 2 there is provided an outlet 30, which through a conduit 31 communicates with an inlet 32 of a housing 33 in which a capillary slide 34 is slidably mounted. The housings 27 and 33 have outlets 35 and 36 respectively, which through conduits 37 and 38 respectively communicate with the oil sump 18. The capillary slide 34 is displaceable forth and back under the influence of a sensing member 39, which is illustrated in the form of a so-called dancing-roller 39, which is rotatable about a stationary pivot 40 and serves to sense the tension of a textile web being conveyed through a textile processing machine. The purpose of the capillary slide 34 is to provide an auxiliary fine control in addition to the manual control effected by means of the knob 10, such as will be explained hereinafter. Such auxiliary control is to be considered an optional feature of the invention.

The operation of the system is as follows: The oil pump 15 continuously circulates a flow of oil from the pump 15 through the conduit 14, the inlet passage 11 and the passage or passages 19 to the capillary passage of the capillary slide 8. When entering the said capillary passage the flow of oil is diveded into two branch flows, viz. one through the left hand portion of the capillary passage, the outlet 29, the inlet 28, the capillary passage of the capillary slide 26, the outlet 35 and the conduit 37 to the sump 18, and the other through the right hand portion of the capillary passage of the capillary slide 8, the conduit 31, the inlet 32, the capillary passage of the capillary slide 34, the outlet 36 and the conduit 38 to the sump 18. It is now first assumed that the capillary slide 34 is in a fixed position so that its capillary passage has a fixed flow resistance. This corresponds to the case where the auxiliary fine control feature is not provided, in which case the capillary slide 34 will be replaced by a suitable form of flow resistance means having a fixed flow resistance. If the operator now turns the knob 10 so as to displace the capillary slide 8 to the left, the length of its capillary passage to the left of the passage 19 is increased while the length of its capillary passage to the right of the passage 19 is decreased. Thus, the pressure drop towards the left will be higher than the pressure drop to the right and consequently the pressure at the left hand end of the housing 1 will be lower than the pressure at the right hand end of same. Thereby the guiding sleeve 2 is displaced to the left and connects the port 20 with the recess 4 and thereby with the pressure side of the pump 15, while the port 21 is connected with the recess 3 and thereby with the oil sump 18. In this manner an oil circulation is established through the conduits 22 and the oil motor 24 and back through the conduit 23, whereby the oil motor is started to displace the control slide of the Kopp-variator to the right. Thereby, the capillary slide 26 is likewise displaced to the right so that the flow resistance of the active portion of the capillary passage of the capillary slide 26 is increased. As a consequence, the pressure to the left of the guiding sleeve 2 is increased so that the guiding sleeve is displaced to the right. This continues until a pressure balance has been established between the spaces at both ends of the guiding sleeve so that the ports 20 and 28 are again closed. This will be the case when the capillary slide 26 has been displaced to such an extent that the proportion of the flow resistance of the left hand portion of the capillary passage of the capillary slide 8 to the flow resistance of the active portion of the capillary passage of the capillary slide 26 is equal to the proportion of the right hand portion of the capillary passage of the capillary slide 8 to the fixed flow resistance represented by the capillary slide 34, disregarding all other flow resistance in the oil circuit. Thus, the branched oil circuit according to the invention may be regarded as a hydraulic equivalent of a Wheatstone-bridge and within the scope of the invention the various fixed and variable resistances may therefore be interchanged according to the same principles as those applying to a Wheatstone-bridge. It will likewise be realized that the direction of flow of the oil in the system may be inverted if desired.

Considering now the auxiliary control that may be obtained by means of the capillary slide 34, it will again be assumed, as an illustrative example, that the member 39 is a dancing roller engaging a textile web being conveyed through a textile processing machine, and it will further be assumed that the textile web is advanced by means of a driving roller or pair of driving rollers connected to the output shaft of the Kopp-variator 25. If the tension in the textile web increases, the dancing roller 39 will be raised so as to displace the capillary slide 34 to the left. Consequently, the active portion of the capillary passage of the capillary slide 34 increases, which again means that the flow resistance of the capillary slide 34 increases. Since the proportion of this flow resistance to that of the right hand portion of the capillary passage of the capillary slide 8 now increases, the pressure at the right hand end of the guiding sleeve 2 is increased and the guiding sleeve is therefore urged to the left to start up the oil motor 24 in a direction to re-establish pressure balance between the two ends of the housing 1. Thus, a state of equilibrium is obtained only when the gear ratio of the Kopp-variator has been so adjusted that the tension in the textile web has the desired value. This is of course only one example of control under the influence of a sensing member. Moreover, it will be realized that while in the embodiment illustrated a manual control and a control under the influence of a sensing member are so to speak superposed on one another, either form of control may be used alone, e.g. in the case of a control only under the influence of a sensing member, this might be arranged to act directly on the capillary slide 8 instead of the manually operable knob 10, in which case the capillary slide 34 would be replaced by a fixed flow resistance.

The combination of a manual control and an automatic auxiliary control is of particular interest where a plurality of devices are to be controlled by means of a common master control unit, as will be described hereinafter.

In the modification illustrated in FIGURE 1 by the dotted connecting lines, the capillary slide 26 is replaced by a back-pressure generating device in the form of a housing 41, in which a rotor 42 is mounted, this rotor being provided with an inlet 43 adjacent the circumference of the housing and an outlet 44 closer to the axis of rotation of the rotor. The rotor has one or more passages 45 opening at the circumference of the rotor through centrifugal force controlled ball valves 46, the other end of the passage or passages 45 opening into a chamber 47 adjacent the axis of rotation of the rotor, in which chamber the outlet 44 is provided. The inlet 43 communicates through a conduit 48 with the outlet 29 of the housing 1, while the outlet 44 communicates through a conduit 49 with the oil sump 18. The capillary slide 26 and the conduits connected thereto are omitted in this embodiment. The rotor 42 is coupled to the output shaft of the Kopp-variator 25. In operation, a back-pressure is produced in the rotor, which back-pressure can be accurately adjusted by means of the centrifugal force controlled valves 46. This back pressure takes the place of the flow resistance produced in the capillary slide 26. When the speed of rotation of the rotor 42 is increased, the back-pressure produced by the rotor is increased, and consequently the pressure to the left of the guiding sleeve 2 in the housing 1 is increased and tends to displace the guiding sleeve 2 to the right similarly as was the case when the capillary slide 26 was displaced to the right. Accordingly the control function will be substantially the same, only in this case it is the speed of rotation of the output shaft of the Kopp-variator that acts directly back on the guiding sleeve.

Figure 2:
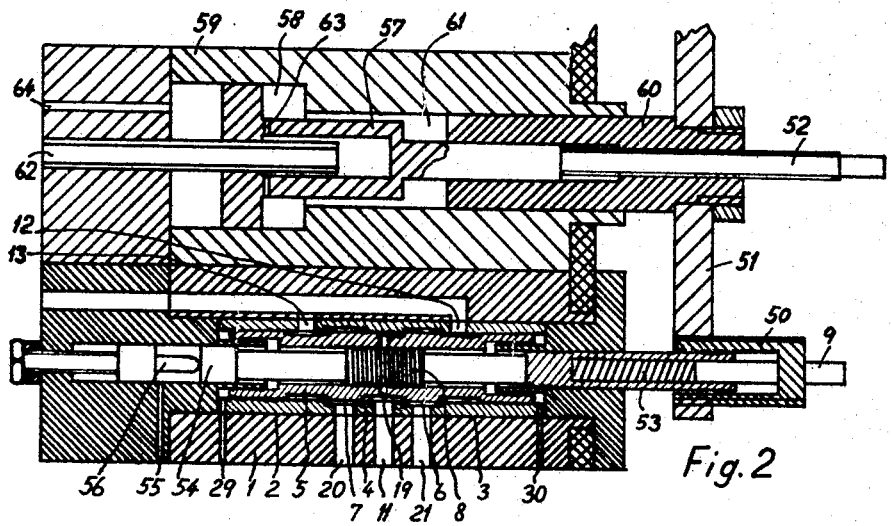
FIGURE 2 shows one form of a master control unit comprising a plurality of capillary slides with individual principal control members and a common master control member.

An example of a control system involving manual master control of a plurality of devices ("second members") will now be decsribed with reference to FIGURE 2. To illustrate the circumstances in which such a master control may be desirable, reference will again be made to a textile processing machine having means for conveying a continuous textile web therethrough. Such a machine may e.g. comprise a pair of input rollers, a belt conveyor for guiding the textile web through a bath in the machine and a pair of output rollers. In such a machine, the speed of the input rollers, the speed of the belt conveyor and the speed of the output rollers will on an average always be proportional and the proportions between the various speeds may be determined either by experiment or by calculation. If it is desired to vary the working speed of the machine, all the three speeds mentioned will be varied in the same proportion. This may be done by means of the master control unit to be described with reference to FIGURE 2. However, owing e.g. to extension or contraction of the textile web in different zones of the textile treating machine undesirable tensioning or slakening may occur, and it will then be necessary to adjust the three speeds referred to relative to one another in such a manner as to eliminate the tensioning or slackening. This may be effected by incorporating in some of or all the control circuits used for controlling the three speeds in question a superposed control by means of a dancing roller as illustrated in FIGURE 1.

Turning now to the master control unit illustrated in FIGURE 2, there is shown at the bottom of that figure a slide housing with guiding sleeve and capillary slide substantially corresponding to the embodiment of FIGURE 1 and therefore denoted by the same reference characters. In this embodiment, the principal control member of the capillary slide 8 is formed by a setting sleeve 50, which threadedly engages a disc 51, which is common to a plurality of slide housings 1 grouped around a master control spindle 52 and each forming part of a separate hydraulic control system of the type illustrated in FIGURE 1. A spring 53 is inserted between the setting sleeve 50 and the capillary slide 8. The other end of the capillary slide engages a piston 54, and the space to the left of this piston has an inlet 55, which is connected to the pressure side of the oil pump 15. An adjustable stop 56 serves to limit movement of the piston 54 and thereby of the capillary slide 8 to the left.

The master control spindle 52 is connected with a piston 57, which is slidable in a bore 58 of a cylinder 59. The master control spindle 52 engages a smooth sleeve 60, which is slidable in a bore 61 of the cylinder 59 and is rigidly connected with the disc 51. The space to the right of the piston 57 in the bore 58 is connected through a pipe 62 and passages 63 with the oil circuit through a magnet valve not shown, by means of which the space may alternatively be connected to the pressure side of the oil pump and to the sump. The space to the left of the piston 57 communicates with the atmosphere through a passage 64.

In the drawing, the master control unit is shown with the parts in the positions they assume when the machinery to be controlled by the unit is not in operation. When starting up the machinery, the space to the right of the piston 57 in the bore 58 is connected with the sump, and when, upon starting up the oil pump an oil pressure is built up in the space to the left of the piston 54 and the corresponding pistons associated with the other capillary slides, not shown, the capillary slides are displaced to the right and through the springs 53, the setting sleeves 50 and the disc 51 urge the master control spindle 52 and the piston 57 to the right until the latter arrives in its right hand end position. The springs 53 are so stiff that they are only compressed to a relatively small extent.

By individually adjusting the setting sleeves 50 of the various capillary slides, it is now possible e.g. to adjust the proportions between the speeds of rotation of shafts driven by different Kopp-variators. By adjusting the master control spindle 52 all the speeds of rotation may be simultaneously increased or decreased, within a suitable control range, in such a manner that their mutual proportion is maintained. As previously mentioned, the hydraulic control system associated with each of the capillary slides may be supplemented by an auxiliary automatic fine control.

When the machinery is stopped, oil is admitted to the pipe 62 and the piston 57 is thereby displaced to the left and also urges the capillary slide 8 to the left until the piston 54 engages the stop 56. This will not take place simultaneously for all the capillary slides, but usually the springs 53 will permit an equalisation to take place so that the pistons 54 of all the capillary slides will eventually engage the stops 56. The parts are now again in the positions illustrated in FIGURE 2, which may suitably correspond to the minimum speeds of revolution of the shafts driven by the Kopp-variators. When the machinery is started up again, all the shafts are therefore started at minimum speed of revolution and maximum torque, whereby a very smooth and shockless starting up is obtained, even if the machinery is started in fully loaded state.

We claim:

1. A hydraulic system for controlling a second member in dependence on a first member, comprising a hydraulic fluid circuit having two branches connected to a common source of driving pressure for producing a continuous flow in each of said branches, flow resistance means being provided in both of said branches, some of said flow resistance means being variable in dependence on said first member and others being variable in dependence on said second member, pressure difference responsive means being provided to detect pressure differences between a point of one branch and a point of the other branch of said hydraulic fluid circuit, and means controlled by said pressure difference responsive means for adjusting said second member so as to vary the flow resistance means governed thereby in a sense to establish pressure balance between said two points of the oil circuit.

2. In a hydraulic control system as in claim 1, a variable flow resistance means in the form of a slide, referred to herein as a capillary slide, surrounded by a guiding sleeve, said capillary slide being provided in its circumferential surface with a helical groove which is closed by the wall of said guiding sleeve to form a helical capillary passage, a hydraulic fluid circulation passage extending through the wall of said guiding sleeve, and at least one other hydraulic fluid circulation passage communicating with one end of said guiding sleeve.

3. A hydraulic control system as in claim 2, in which said guiding sleeve is slidably mounted in a housing having ports alternatively connectable to a hydraulic fluid inlet and to a hydraulic fluid outlet by displacement of said guiding sleeve in said housing, hydraulically operated adjusting means for said second member being connected between said ports, hydraulic fluid circulating passages being provided to communicate with both ends of said guiding sleeve.

4. A hydraulic control system as in claim 3, in which said capillary slide is displaceable under the influence of a principal control member, and the hydraulic fluid circulation passage from one end of said guiding sleeve is connected to a flow resistance member variable under the influence of said second member.

5. A hydraulic control system as in claim 4, in which the hydraulic fluid circulation passage from the other end of said guiding sleeve is connected to a flow resistance member variable under the influence of an auxiliary fine control member.

6. A hydraulic control system as in claim 1, in which said second member is a rotating part, the speed of rotation of which is to be controlled, and in which a flow resistance means variable in dependence on said second member is in the form of a rotor coupled to said rotating part and having at least one hydraulic fluid passage provided therein, the inlet end of said hydraulic fluid passage being located at a greater distance from the axis of rotation of said rotor than the outlet end of said hydraulic fluid passage.

7. A hydraulic control system as in claim 6, in which a centrifugal force controlled valve is provided in said hydraulic fluid passage.

8. A hydraulic system as in claim 4, in which the principal control members of a plurality of capillary slides are individually adjustably connected with a common master control member.

9. A hydraulic control system as in claim 8, in which a spring is inserted between each of the principal control members and the capillary slide associated therewith, and the end of the capillary slide remote from the principal control member is under the influence of the hydraulic pressure in a space having a hydraulic fluid inlet from the hydraulic fluid circuit, said common master control member being connected with a piston, one side of which is alternatively connectable to hydraulic pressure and releasable from such pressure.

References Cited

UNITED STATES PATENTS

| 2,005,731 | 6/1935 | Ernst et al. | 60—52 |
| 2,006,865 | 7/1935 | Lake | 60—52 XR |
| 2,085,303 | 6/1937 | Ernst | 60—52 |
| 2,682,748 | 7/1954 | Ernst | 91—388 XR |

EDGAR W. GEOGHEGAN, Primary Examiner

U.S. Cl. X.R.

60—53; 91—37, 388